(12) United States Patent
Umeda et al.

(10) Patent No.: US 6,693,938 B1
(45) Date of Patent: Feb. 17, 2004

(54) DISCHARGE CIRCUIT FOR PULSED LASER

(75) Inventors: Hiroshi Umeda, Hiratsuka (JP); Yasufumi Kawasuji, Oyama (JP); Tetsutarou Takano, Isehara (JP)

(73) Assignee: Komatsu Ltd., Tokyo (JP)

( * ) Notice: Subject to any disclaimer, the term of this patent is extended or adjusted under 35 U.S.C. 154(b) by 239 days.

(21) Appl. No.: 09/657,669

(22) Filed: Sep. 8, 2000

(51) Int. Cl.$^7$ ................ H01S 3/00; H01S 3/22
(52) U.S. Cl. ............ 372/55; 372/38.02; 372/38.07; 372/38.05; 372/38.1
(58) Field of Search ............ 372/55, 38.02, 372/38.07, 38.05, 38.1

(56) References Cited

U.S. PATENT DOCUMENTS

| | | | | |
|---|---|---|---|---|
| 5,181,217 A | * | 1/1993 | Sato et al. ............ | 372/38 |
| 5,247,531 A | * | 9/1993 | Muller-Horsche ...... | 372/38 |
| 5,305,339 A | * | 4/1994 | Nakatani et al. ....... | 372/38 |
| 5,708,676 A | * | 1/1998 | Minamitani et al. .... | 372/86 |

FOREIGN PATENT DOCUMENTS

| | | | |
|---|---|---|---|
| JP | 5-90681 | * | 4/1993 |
| JP | 6-112566 | * | 4/1994 |

\* cited by examiner

*Primary Examiner*—George Eckert
*Assistant Examiner*—Joseph Nguyen
(74) *Attorney, Agent, or Firm*—Welsh & Katz, Ltd.

(57) ABSTRACT

A discharge circuit for pulsed laser 10 in which one connecting portion of a preionization capacitor Cpp is connected to a preionization electrode 4 and the other one connecting portion of the preionization capacitor Cpp is connected to a junction between a capacitor C2 and a magnetic switch AL2. In the discharge circuit for pulsed laser 10, a voltage Vcc of the preionization capacitor Cpp, which is charged in synchronization with the charging of the capacitor C2, increases at a time t3 earlier by a predetermined time than a start time t6 of main discharge by the main discharge electrodes 1, 2. When a voltage of the preionization electrode 4 increases to a predetermined preionization start voltage through the preionization capacitor Cpp, a main discharge gap 3 is preionized by a corona discharge caused by the preionization electrode 4 and the main discharge is caused by the main discharge electrodes 1, 2 with the main discharge gap 3 fully preionized.

9 Claims, 11 Drawing Sheets

DISCHARGE CIRCUIT FOR PULSED LASER

BACKGROUND OF THE INVENTION

1. Field of the Invention

The present invention relates to a discharge circuit for pulsed laser which performs pulsed laser oscillation by preionizing across main discharge electrodes disposed in a laser medium and performing a main discharge to excite the laser medium.

2. Description of the Prior Art

TEA laser causes a uniform glow discharge across a pair of opposing main discharge electrodes to form an inverted population region necessary for laser oscillation.

To obtain the glow discharge spread to fill the entire main discharge gap, the TEA laser has to cause preionization before starting the main discharge to ionize the entire main discharge gap previously. Especially, an excimer laser has to ionize as many as possible immediately before the main discharge because the electrons in a negative gas have a short lifetime.

Currently, various types of methods using X rays, a spark discharge, a corona discharge or the like are used as a preionizing method. Among them, a method using the corona discharge is extensively used because it is relatively simple and easy and has less contamination of a laser gas.

FIG. 10 shows an equivalent circuit of a conventional capacity shift type magnetic pulse compression discharge device, namely of a discharge circuit for pulsed laser, which employs the corona discharge for the preionization. FIG. 11 shows an example of voltage and electric current waveforms at respective points of the discharge circuit for pulsed laser shown in FIG. 10.

In the discharge circuit for pulsed laser shown in FIG. 10, corona preionization capacitor (hereinafter called the preionization capacitor) Cpp and corona preionization electrode (hereinafter called the preionization electrode) 4 are disposed to preionize in main discharge gap 3 which is formed between a pair of main discharge electrodes 1, 2, and a laser medium in the main discharge gap between the main discharge electrodes 1, 2 is preionized by UV (ultraviolet) light produced by a corona discharge at the preionization electrode 4.

The discharge circuit for pulsed laser shown in FIG. 10 has two-stage magnetic pulse compression circuit utilizing a saturation phenomenon of three magnetic switches AL0 to AL2 each made of a saturable reactor.

In the discharge circuit for pulsed laser shown in FIG. 10, an electric charge is applied from high-voltage power source HV to capacitor C0 through the magnetic switch AL0 and coil L1.

Then, when pulse oscillation synchronizing signal (trigger signal) TR, which is turned on in synchronization with a repetition frequency of a pulsed laser oscillation, is input, main switch SW is turned on (at the moment t0 shown in FIG. 11). When the main switch SW is turned on, electric potential VSW of the main switch SW drops sharply to zero. When time integral (namely, a time integral value of voltage VC0) S0 of voltage difference "VC0-VSW" between the capacitor C0 and the main switch SW as voltages at both ends of the magnetic switch AL0 reaches a threshold value which is based on a set characteristic of the magnetic switch AL0, the magnetic switch AL0 is saturated at the moment t1, and electric current pulse i0 flows through a loop of the capacitor C0, the magnetic switch AL0, the main switch SW and capacitor C1.

Duration $\delta 0$ in which the electric current pulse i0 starts to flow and becomes 0 (the moment t2 shown in FIG. 11), namely electric charge transfer time $\delta 0$ in which the electric charge is completely transferred from the capacitor C0 to the capacitor C1, is based on respective capacitance of the inductance, the capacitor C0 and the capacitor C1 after the magnetic switch AL0 is saturated with loses due to the main switch SW and the like disregarded.

Meanwhile, when time integral S1 of the voltage VC1 of the capacitor C1 reaches the threshold value which depends on the set characteristic of the magnetic switch AL1, the magnetic switch AL1 is saturated and has a low inductance at the moment t3. Thus, electric current pulse i1 flows through a loop of the capacitor C1, capacitor C2 and the magnetic switch AL1. The electric current pulse i1 becomes 0 at the moment t4 after a lapse of predetermined transfer time $\delta 1$ which is determined by an inductance after the saturation of the magnetic switch AL1 and the capacitance of the capacitors C1, C2.

When time integral S2 of voltage VC2 of the capacitor C2 reaches a threshold value which is based on a set characteristic of the magnetic switch AL2, the magnetic switch AL2 is saturated at the moment t5. Thus, electric current pulse i2 flows through a loop of the capacitor C2, peaking capacitor CP and the magnetic switch AL2. The flow of the electric current pulse i2 rises voltage Vcp of the peaking capacitor Cp and voltage VCpp of the preionization capacitor Cpp.

Then, when the voltage of the preionization electrode 4 rises to a predetermined preionization start voltage through the preionization capacitor Cpp, a corona discharge is caused at the preionization electrode 4 to flow electric current i3, and the main discharge gap 3 is preionized.

Besides, the voltage VCp of the peaking capacitor Cp rises further with the progress of charging. And, when the voltage VCp reaches a predetermined main discharge start voltage, a laser gas between the main discharge electrodes 1, 2 is undergone an electrical breakdown at the moment t6, and a main electrical discharge is started across the main discharge electrodes 1, 2 to flow electric current i4. The laser medium is excited by the main electrical discharge caused across the main discharge electrodes 1, 2, and laser light is emitted in several nsec.

Then, the voltages of the peaking capacitor Cp and the preionization capacitor Cpp drop sharply owing to the main discharge and return to the states before the charging was started after a lapse of a predetermined period.

Such an electrical discharge operation is repeated by the switching operation of the main switch SW which is synchronized with the trigger signal TR to perform pulsed laser oscillation at a predetermined repetition frequency (namely, a pulse oscillation frequency).

In such a case, because it is determined that the electric charge transfer circuit of each stage which is comprised of the magnetic switch and the capacitor has smaller inductance toward later stages, the pulse compression operation is performed so that the peak values of the electric current pulses i0 to i2 become high sequentially and the electrifying duration becomes shorter sequentially. As a result, an intense electrical discharge is caused across the main discharge electrodes 1, 2 in a short period of time.

An electrical discharge circuit other than the discharge circuit for pulsed laser shown in FIG. 10 is disclosed in Japanese Patent Application No. 9-271207 (Laid-Open Publication No. 11-112300) filed in Japan in the name of the applicant of this patent application.

Density Ne0 of electrons produced by the preionization and its spatial distribution have an influence upon the growth and stability of a glow discharge in the high-pressure laser gas. And, they are included in the factors which exert an influence upon the laser output power, the spatial intensity distribution of the laser beam, the pulse width and the like.

With the increase of the electron density Ne0, the generation and maintenance of the stable glow discharge are facilitated, and the laser output power obtained is also increased.

But, in the above conventional discharge circuit for pulsed laser, the main discharge (namely, the glow discharge) by the main discharge electrodes 1, 2 is started in a state that the preionization in the main discharge gap by the corona discharge is not performed sufficiently, namely in a state before reaching the aforesaid electron density Ne0 with that the stable glow discharge can be caused and maintained. Therefore, the stability and oscillation efficiency of the energy of the pulsed laser light subject to a pulse oscillation are degraded.

In other words, the preionization capacitor Cpp is connected to the peaking capacitor Cp, so that the preionization capacitor Cpp is also charged in synchronization with the charging to the peaking capacitor Cp.

Therefore, emission timing of the corona discharge (preionization discharge) by the preionization electrode 4 depends on the voltage applied to the main discharge electrodes 1, 2, and the duration between the corona discharge by the preionization electrode 4 and the main discharge by the main discharge electrodes 1, 2 becomes short.

Accordingly, the main electrical discharge (namely, the glow discharge) by the main discharge electrodes 1, 2 is started before the aforesaid electron density Ne0 in the main discharge gap 3 reaches an electron density with that the stable glow discharge can be caused and maintained.

As described above, the conventional discharge circuit for pulsed laser has a short duration between the corona discharge by the preionization electrode 4 and the main discharge by the main discharge electrodes 1, 2. Therefore, the main electrical discharge is caused with the preionization in an insufficient state, and the energy stability of the pulsed laser light and the high oscillation efficiency cannot be obtained.

OBJECTS AND SUMMARY OF THE INVENTION

The present invention was achieved in view of the circumstances described above. And, it is an object of the invention to provide a discharge circuit for pulsed laser which can start a main discharge across main discharge electrodes with a main discharge gap between the main discharge electrodes fully preionized.

A first aspect of the invention is directed to a discharge circuit for pulsed laser including a power supply and main discharge electrodes disposed in a laser medium, which causes a main discharge after causing a preionization between the main discharge electrodes, the discharge circuit comprising:

a main discharge capacitor which is connected in parallel to the main discharge electrodes and accumulates electric charges;

a forwarding capacitor which is connected in parallel to the main discharge capacitor and accumulates electric charges supplied from the power supply;

a magnetic switch which is disposed in correspondence with the forwarding capacitor and transfers the electric charges accumulated in the forwarding capacitor to the main discharge capacitor;

a preionization electrode for preionizing between the main discharge electrodes; and a preionization capacitor connected at one connecting portion thereof with the preionization electrode, for accumulating electric charges for causing a preionization discharge at the preionization electrode, wherein the other connecting portion of the preionization capacitor is connected to the forwarding capacitor.

A second aspect of the invention is the discharge circuit for pulsed laser according to the first aspect of the invention, wherein the forwarding capacitor is comprised of at least one forwarding capacitor connected in parallel to the main discharge capacitor;

the magnetic switch is disposed in correspondence with the at least one forwarding capacitor and comprised of at least one magnetic switch for transferring the electric charges accumulated in the forwarding capacitor to a next forwarding capacitor or the main discharge capacitor; and the other connecting portion of the preionization capacitor is connected to a predetermined particular forwarding capacitor among the at least one forwarding capacitor.

A third aspect of the invention is the discharge circuit for pulsed laser according to the second aspect of the invention, wherein the other connecting portion of the preionization capacitor is connected to a final forwarding capacitor or a forwarding capacitor which is disposed on the side of the power supply than the side of the final forwarding capacitor.

The first to third aspects of the invention will be described with reference to FIG. 1 and FIG. 2.

In discharge circuit for pulsed laser 10 shown in FIG. 1, one connecting portion of preionization capacitor Cpp whose other connecting portion is connected to preionization electrode 4 is connected to a junction between capacitor C2 as a forwarding capacitor and magnetic switch AL2.

In such a case, when an electric charge is transferred from capacitor C1 to the capacitor C2, namely when electric current pulse i1 flows through a loop of capacitor C1 as a forwarding capacitor, the capacitor C2 and the magnetic switch AL2 at the time t3 shown in FIG. 2, voltage VC2 of the capacitor C2 and voltage VCpp of the preionization capacitor Cpp are increased because the one connecting portion of the preionization capacitor Cpp is connected to the capacitor C2.

Then, when the voltage of the preionization electrode 4 is increased to a predetermined preionization start voltage through the preionization capacitor Cpp, a corona discharge is caused at the preionization electrode 4 to flow electric current i3, and the main discharge gap 3 is preionized.

In other words, the voltage VCpp of the preionization capacitor Cpp which is charged in synchronization with charging of the capacitor C2 at the time t3 shown in FIG. 2. And, when the voltage of the preionization electrode 4 is increased to a predetermined preionization start voltage through the preionization capacitor Cpp, the main discharge gap 3 is preionized by the corona discharge caused by the preionization electrode 4.

Meanwhile, when the magnetic switch AL2 is saturated at the time t5 shown in FIG. 2, the electric charge accumulated in the capacitor C2 is transferred to peaking capacitor Cp as a main discharge capacitor, and voltage VCp of the peaking capacitor Cp is increased. When the voltage VCp reaches a predetermined main discharge start voltage, a laser gas between the main discharge electrodes 1, 2 is undergone an electric breakdown at the time t6, and the main discharge is started across the main discharge electrodes 1, 2 to flow electric current i4. And, the laser medium is excited by the main discharge caused across the main discharge electrodes 1, 2, and laser light is produced in several nsec.

Thus, the corona discharge is caused at the preionization electrode 4 to preionize according to the voltage VCpp of the preionization capacitor Cpp which is charged at the time t3 shown in FIG. 2, and the main discharge gap 3 is fully preionized before the main discharge is caused at the time t6 shown in FIG. 2.

In the discharge circuit for pulsed laser 10 shown in FIG. 1, the one connecting portion of the preionization capacitor Cpp whose other connecting portion is connected to the preionization electrode 4 is connected to the junction between the capacitor C2 and the magnetic switch AL2 but may be connected to a junction between the capacitor C1 and the magnetic switch AL1.

In such a case, when the electric charge is transferred from the capacitor C0 to the capacitor C1, namely when the current pulse i0 flows through a loop of the capacitor C0, the magnetic switch AL0, the main switch SW and the capacitor C1 at the time t1 shown in FIG. 5, the voltage VC1 of the capacitor C1 and the voltage VCpp of the preionization capacitor Cpp are increased because the one connecting portion of the preionization capacitor Cpp is connected to the capacitor C1.

Then, when the voltage of the preionization electrode 4 is increased to a predetermined preionization start voltage through the preionization capacitor Cpp, a corona discharge is caused at the preionization electrode 4 to flow the electric current i3, and the main discharge gap 3 is preionized.

In other words, the voltage VCpp of the preionization capacitor Cpp which is charged in synchronization with the charging of the capacitor C1 at the time t1 shown in FIG. 5. And, when the voltage of the preionization electrode 4 is increased to a predetermined preionization start voltage through the preionization capacitor Cpp, the main discharge gap 3 is preionized by the corona discharge caused by the preionization electrode 4.

Meanwhile, the laser gas between the main discharge electrodes 1, 2 is undergone the electric breakdown at the time t6 shown in FIG. 5 to start the main discharge across the main discharge electrodes 1, 2 so to flow the electric current i4. And, the laser medium is excited by the main discharge caused across the main discharge electrodes 1, 2, and laser light is produced in several nsec.

Thus, when the corona discharge caused at the preionization electrode 4 to preionize according to the voltage VCpp of the preionization capacitor Cpp which is charged at the time t1 shown in FIG. 5, the main discharge gap 3 is fully preionized before the main discharge is started at the time t6 shown in FIG. 5.

As described above, according to the first to third aspects of the invention, the one connecting portion of the preionization capacitor Cpp whose other connecting portion is connected to the preionization electrode 4 is not connected to the peaking capacitor Cp but to the capacitor C2 before the peaking capacitor Cp or the capacitor C1 two stages before the peaking capacitor Cp, so that the emission timing of preionization can be synchronized with the charging of the capacitor C2 or the capacitor C1. Thus, the main discharge by the main discharge electrodes 1, 2 can be performed in the fully preionized state.

Therefore, the main discharge is readily caused, and the produced main discharge is stabilized. Accordingly, the laser output can be stabilized.

A fourth aspect of the invention is the discharge circuit for pulsed laser according to the first, second or third aspect of the invention, wherein a one-directional circuit element is disposed between the other connecting portion of the preionization capacitor and a forwarding capacitor connected with the other connecting portion in order to prevent an electric current from flowing from the connecting portion to the preionization capacitor.

A fifth aspect of the invention is the discharge circuit for pulsed laser according to the fourth aspect of the invention, wherein the one-directional circuit element is a diode.

A sixth aspect of the invention is the discharge circuit for pulsed laser according to the fourth aspect of the invention, wherein the one-directional circuit element is a saturable reactor which is pre-saturated by a forward current.

Then, the fourth to sixth aspects of the invention will be described.

In the equivalent circuit of the discharge circuit for pulsed laser 30 shown in FIG. 6, diode D is disposed as a one-directional circuit element between the capacitor C2 and the preionization capacitor Cpp.

If the diode D is omitted from the equivalent circuit shown in FIG. 6 (namely, the equivalent circuit shown in FIG. 1), this diode D prevents current pulse ipp from flowing to the preionization capacitor Cpp when the electric charge is transferred from the capacitor C2 to the peaking capacitor Cp as the current pulse i2 flows.

In the equivalent circuit of discharge circuit for pulsed laser 40 shown in FIG. 7, the diode D is disposed between the capacitor C1 and the preionization capacitor Cpp.

When the diode D is omitted from the equivalent circuit shown in FIG. 7 (namely, the equivalent circuit shown in FIG. 4), the diode D prevents the current pulse ipp from flowing to the preionization capacitor Cpp when the electric charge is transferred from the capacitor C1 to the capacitor C2 as the current pulse i1 flows.

Instead of the diode D, a saturable reactor AL3 which is pre-saturated by a forward current may be disposed as a one-directional circuit element between the capacitor C1 or the capacitor C2 and the preionization capacitor Cpp as shown in FIG. 8 or FIG. 9.

The saturable reactor AL3 prevents the current pulse ipp in the same way as the diode D.

Thus, where the one-directional circuit element is not disposed between the preionization capacitor and the forwarding capacitor, the current pulse flowing from the connecting portion to the preionization capacitor can be prevented according to the fourth to sixth aspects of the invention.

Therefore, the voltage of the preionization electrode is increased to the predetermined preionization start voltage through the preionization capacitor which is charged as the current pulse flows, and the second corona discharge (namely, the second preionization) by the preionization electrode can be prevented from occurring.

DETAILED DESCRIPTION OF THE PREFERRED EMBODIMENTS

Embodiments of the present invention will be described with reference to the accompanying drawings.

First Embodiment:

Ii is assumed in this embodiment that the discharge circuit for pulsed laser according to the invention is applied to a capacity transit type magnetic compression discharge device.

Figure 1:
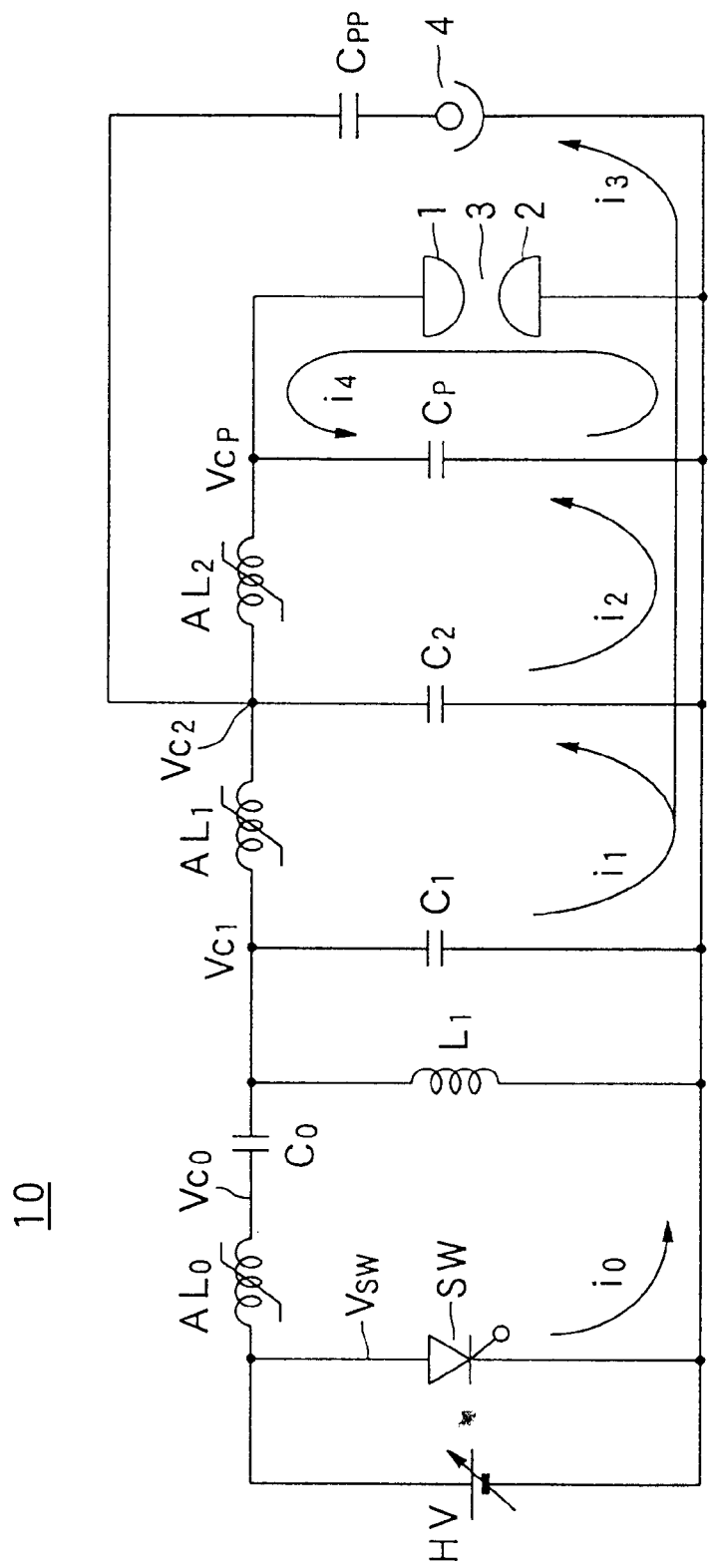
FIG. 1 is a circuit block diagram showing a structure of the discharge circuit for pulsed laser according to a first embodiment of the invention.
Figure 2:
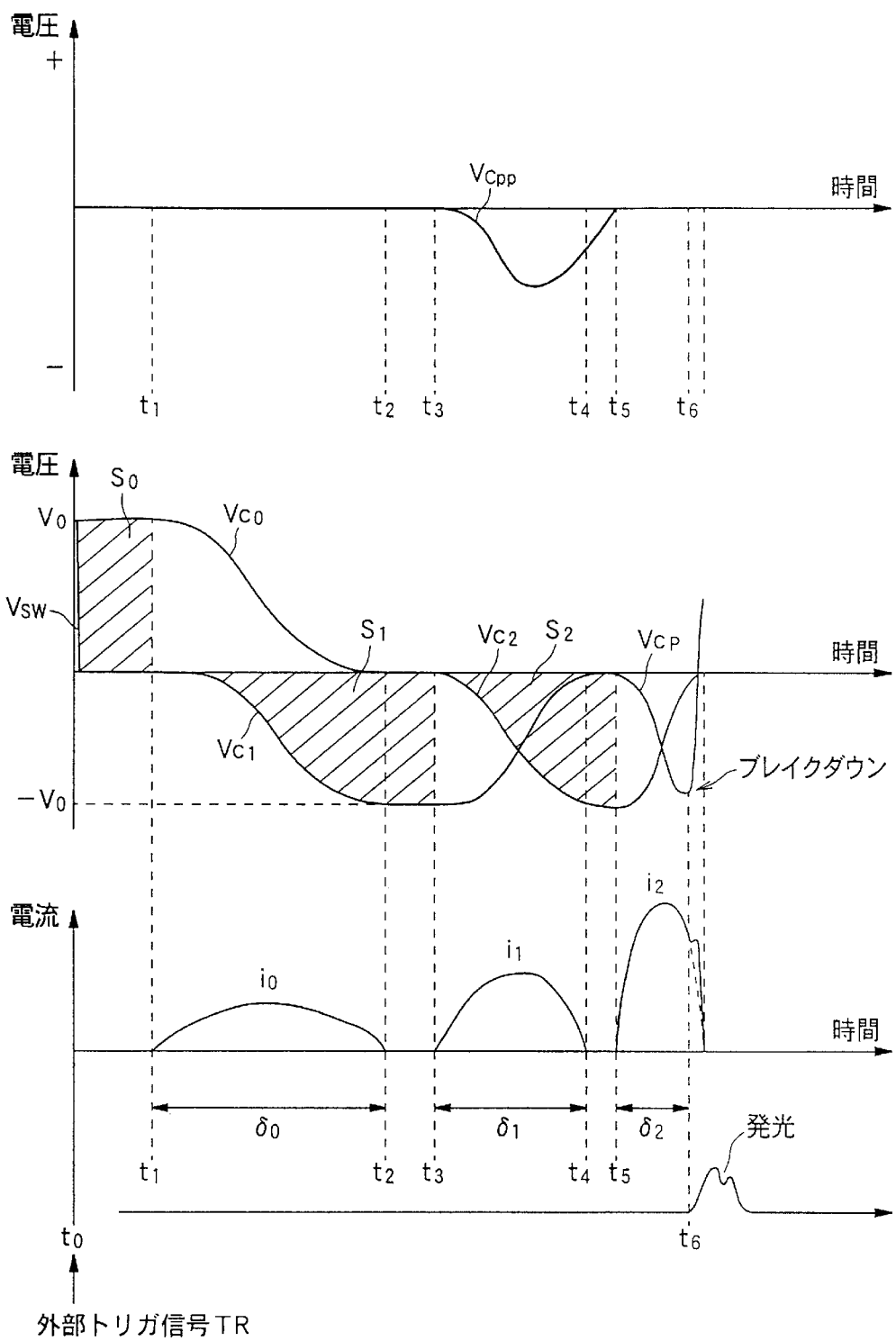
FIG. 2 is a time chart showing voltage and electric current waveforms at respective points of the discharge circuit for pulsed laser according to the first embodiment.

FIG. 1 is a circuit block diagram showing an equivalent circuit of the discharge circuit for pulsed laser 10 according to this embodiment. FIG. 2 shows voltage and electric current waveform examples at respective points of the discharge circuit for pulsed laser 10.

Figure 10:
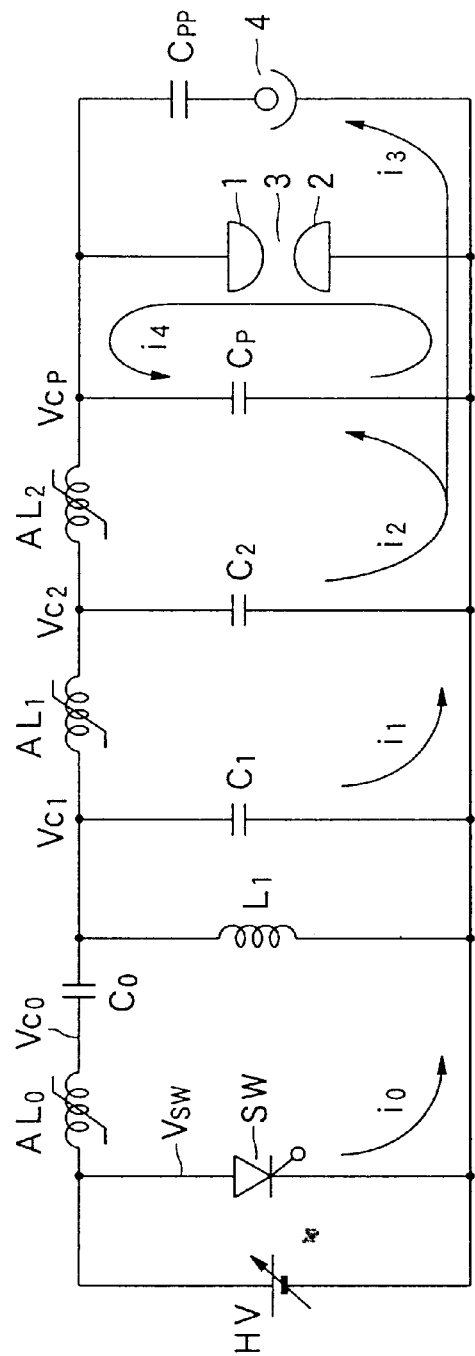
FIG. 10 is a circuit block diagram showing the structure of a conventional discharge circuit for pulsed laser.

The discharge circuit for pulsed laser 10 is similar to the conventional discharge circuit for pulsed laser shown in FIG. 10 except that one connecting portion of the preionization capacitor Cpp whose other connecting portion is connected to the preionization electrode 4 was changed to connect to another connecting point.

The preionization capacitor Cpp has its one connecting portion connected to a junction between the capacitor C2 and the magnetic switch AL2.

In the discharge circuit for pulsed laser 10 configured as described above, a transfer of an electric charge from the capacitor C0 to the capacitor C1, from the capacitor C1 to the capacitor C2 and from the capacitor C2 to the peaking capacitor Cp is performed in the same way as in the conventional discharge circuit for pulsed laser shown in FIG. 10.

In this embodiment, when the electric charge is transferred from the capacitor C1 to the capacitor C2, namely when the current pulse i1 flows through the loop of the capacitor C1, the capacitor C2 and the magnetic switch AL1 at time t3 shown in FIG. 2, the voltage VC2 of the capacitor C2 and the voltage VCpp of the preionization capacitor Cpp are increased because the one connecting portion of the preionization capacitor Cpp is connected to the capacitor C2.

Then, when the voltage of the preionization electrode 4 rises to a predetermined preionization start voltage through the preionization capacitor Cpp, a corona discharge is caused at the preionization electrode 4 to flow the electric current i3, and the main discharge gap 3 is preionized.

In other words, the voltage VCpp of the preionization capacitor Cpp which is charged in synchronization with the charging of the capacitor C2 at the time t3 shown in FIG. 2 increases. And, when the voltage of the preionization electrode 4 increases to a predetermined preionization start voltage through the preionization capacitor Cpp, the main discharge gap 3 is preionized by the corona discharge caused by the preionization electrode 4.

Meanwhile, the aforesaid current pulse i1 becomes 0 at the time t4 shown in FIG. 2 after a predetermined transfer time δ1 determined by an inductance after the capacity of the capacitors C1, C2 and the magnetic switch AL1 are saturated.

And, when the time integral S2 of the voltage VC2 of the capacitor C2 reaches a limiting value which depends on a determined characteristic of the magnetic switch AL2, the magnetic switch AL2 is saturated at the time t5. Thus, the current pulse i2 flows through a loop of the capacitor C2, the peaking capacitor Cp and the magnetic switch AL2, and the voltage VCp of the peaking capacitor Cp rises.

Besides, the voltage VCp of the peaking capacitor Cp increases with the progress of charging, and when the voltage VCp reaches a predetermined main discharge start voltage, a laser gas between the main discharge electrodes 1, 2 is undergone an electrical breakdown at the time t6, and the main discharge is started across the main discharge electrodes 1, 2 to flow the electric current i4. And, the laser medium is excited by the main discharge caused across the main discharge electrodes 1, 2, and laser light is produced in several nsec.

Figure 3:
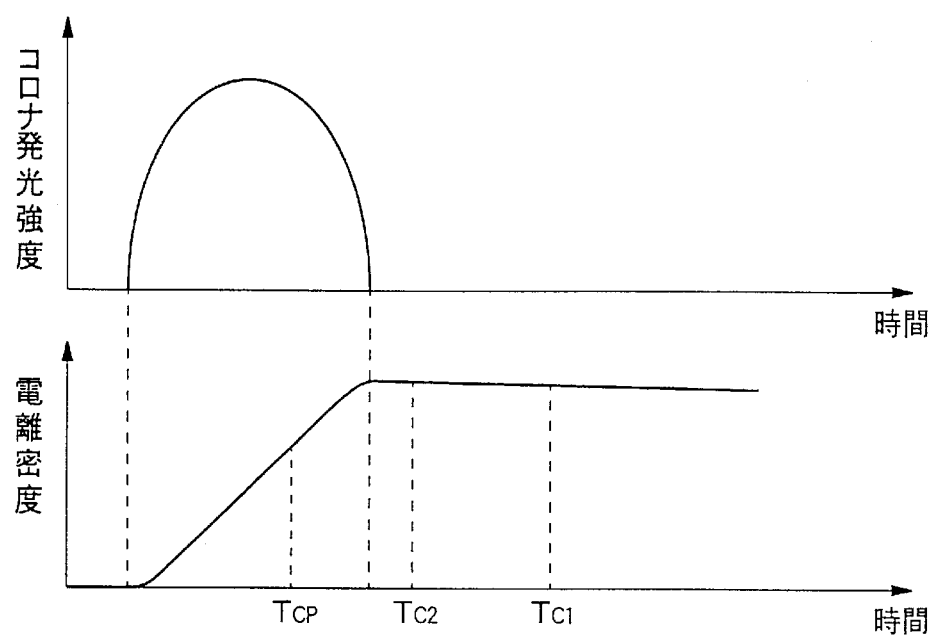
FIG. 3 is a characteristic diagram showing a relationship between a corona emission intensity and an ionization density at a preionization discharge by a preionization electrode.

Generally, an intensity of the corona emission (namely, the corona emission intensity) by the corona discharge and the ionization density have the relationship as shown in FIG. 3. The ionization density increases gradually while the corona emission (namely the corona discharge) is being caused, and a predetermined value is maintained for a predetermined period even after the corona emission is completed.

Therefore, when the preionization is caused owing to the occurrence of the corona discharge by the preionization electrode 4 according to the voltage VCpp of the preionization capacitor Cpp charged at the time t3 shown in FIG. 2, the main discharge gap 3 is fully preionized before the main discharge is started at the time t6 shown in FIG. 2. In this embodiment, emission timing of the preionization may be determined to be earlier, for example, by several hundred nsec, than the start of the main discharge.

For example, time TC2 in the characteristics shown in FIG. 3 corresponds to the time t6 in the time chart shown in FIG. 2. Therefore, the main discharge can be caused by the main discharge electrodes 1, 2 in the fully preionized state in this embodiment.

Thus, the full preionization of the main discharge gap means that electron density Ne0 produced by the preionization has reached a predetermined value such that the production and maintenance of a stable glow discharge (main discharge) are facilitated.

Accordingly, the main discharge is easily caused and stabilized in such a preionized state (predetermined electron density Ne0).

Figure 11:
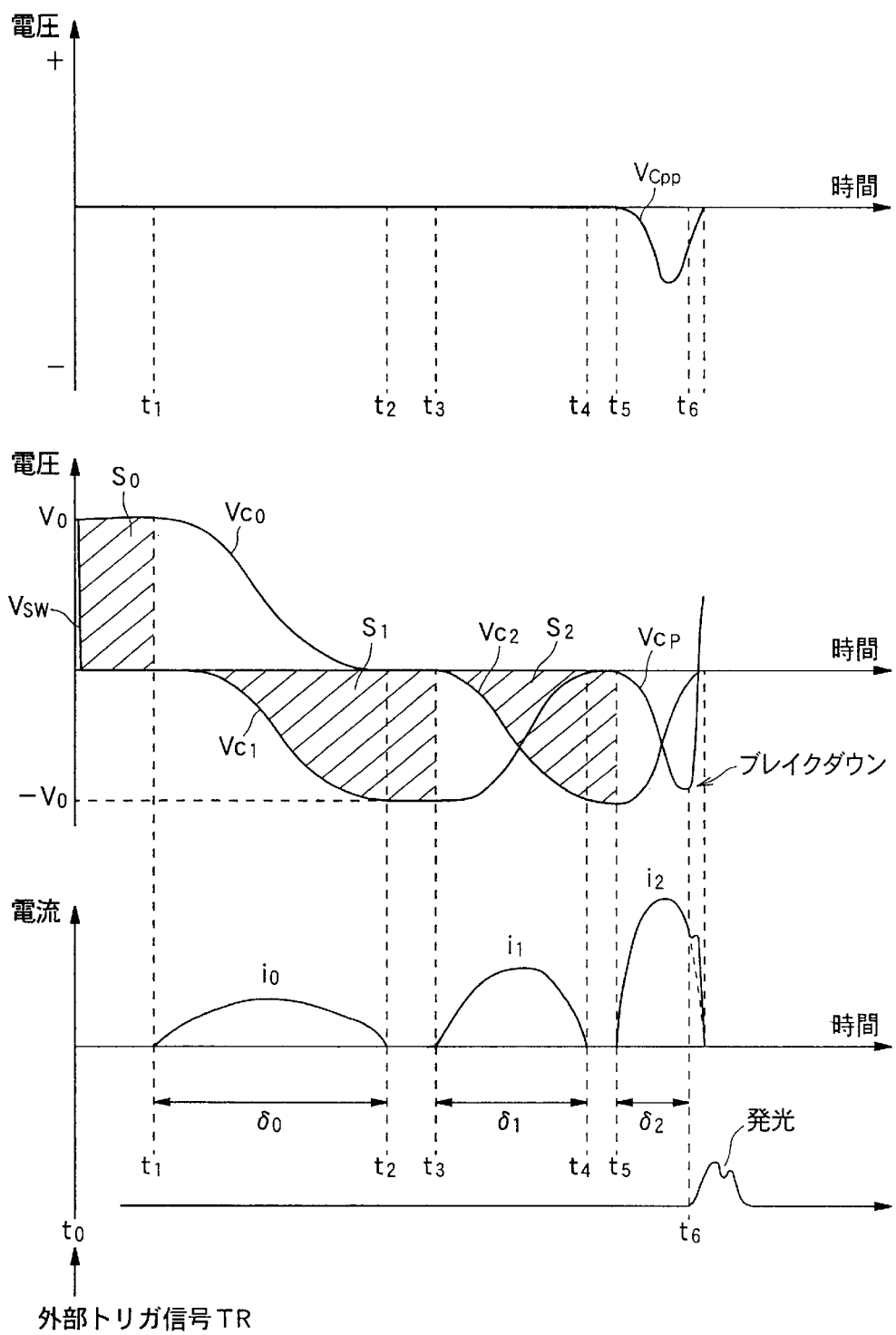
FIG. 11 is a time chart showing voltage and electric current waveforms at respective points of the conventional discharge circuit for pulsed laser.

In the conventional discharge circuit for pulsed laser shown in FIG. 10, for example the time TCp in the characteristics shown in FIG. 3 corresponds to the time t6 shown in FIG. 11. Therefore, the main discharge is conventionally caused by the main discharge electrodes 1, 2 in an insufficient preionization state (namely, the preionization is being caused), and the aforesaid stability and oscillation efficiency of the energy of the pulsed laser light could not be obtained.

Then, an application example of the embodiment will be described below.

Figure 4:
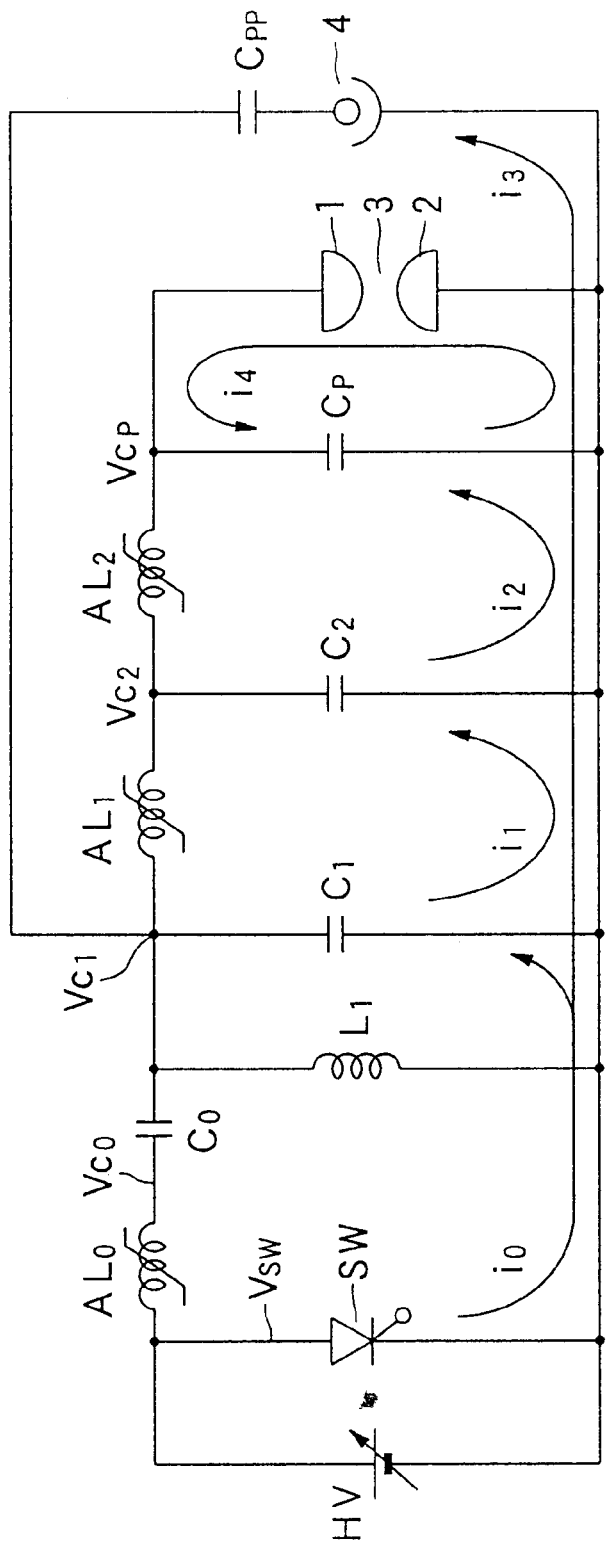
FIG. 4 is a circuit block diagram showing the structure of an application example of the first embodiment.
Figure 5:
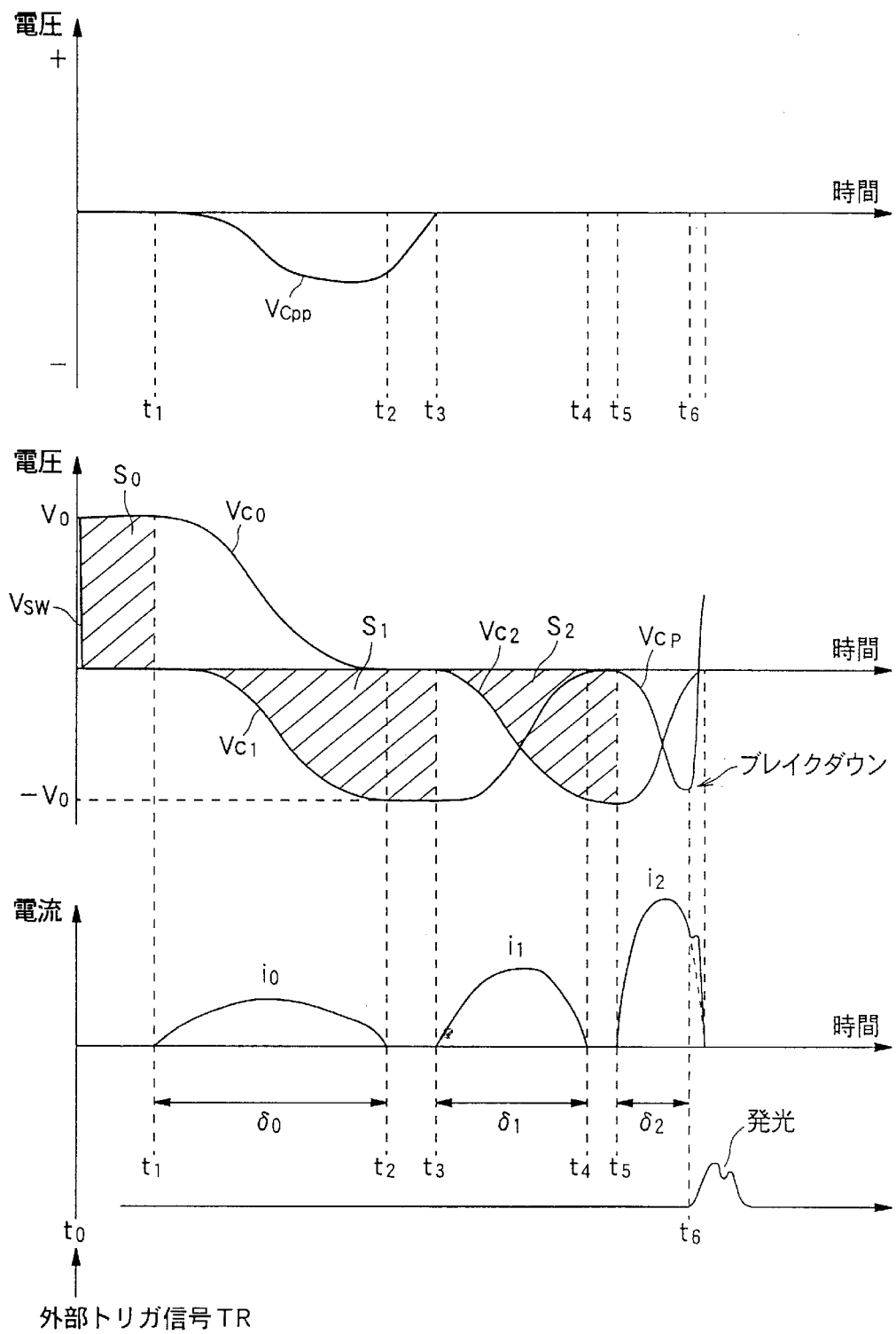
FIG. 5 is a time chart showing voltage and electric current waveforms at respective points of the discharge circuit for pulsed laser of the application example shown in FIG. 4.

FIG. 4 shows an equivalent circuit of discharge circuit for pulsed laser 20 of this application example. FIG. 5 shows voltage and electric current waveform examples at respective points of the discharge circuit for pulsed laser 20.

The discharge circuit for pulsed laser 20 shown in FIG. 4 has a structure similar to that of the discharge circuit for pulsed laser 10 shown in FIG. 1 except that one connecting portion of the preionization capacitor Cpp whose other connecting portion is connected to the preionization electrode 4 is changed to connect to a different connecting point.

Specifically, the preionization capacitor Cpp has its one connecting portion connected to a junction between the capacitor C1 and the magnetic switch AL1 as shown in FIG. 4.

In the discharge circuit for pulsed laser 20 configured as described above, a transfer of an electric charge from the capacitor C0 to the capacitor C1, from the capacitor C1 to the capacitor C2 and from the capacitor C2 to the peaking capacitor Cp is performed in the same way as in the discharge circuit for pulsed laser 10 (namely, the conventional discharge circuit for pulsed laser shown in FIG. 10) shown in FIG. 1.

In such a case, timing of charging of the preionization capacitor Cpp is different from that in the discharge circuit for pulsed laser 10 shown in FIG. 1.

Then, charging of the preionization capacitor Cpp, namely the emission timing by the preionization electrode 4, will be described below.

When an electric charge is transferred from the capacitor C0 to the capacitor C1, in other words, when current pulse i0 flows through a loop of the capacitor C0, the magnetic switch AL0, the main switch SW and the capacitor C1 at the time t1 shown in FIG. 5, the voltage VC1 of the capacitor C1 and the voltage VCpp of the preionization capacitor Cpp are increased because the one connecting portion of the preionization capacitor Cpp is connected to the capacitor C1.

Then, when the voltage of the preionization electrode 4 is increased to a predetermined preionization start voltage through the preionization capacitor Cpp, the corona discharge is caused at the preionization electrode 4 to flow the electric current i3, and the main discharge gap 3 is preionized.

In other words, the voltage VCpp of the preionization capacitor Cpp which is charged in synchronization with the charging of the capacitor C1 at the time t1 shown in FIG. 5 is increased. And, when the voltage of the preionization electrode 4 is increased to a predetermined preionization start voltage through the preionization capacitor Cpp, the main discharge gap 3 is preionized by the corona discharge caused by the preionization electrode 4.

A transfer of an electric charge from the capacitor C1 to the capacitor C2 and from the capacitor C2 to the peaking capacitor Cp is performed in the same way as in the case of the conventional discharge circuit for pulsed laser shown in FIG. 10. Therefore, the laser gas between the main discharge electrodes 1, 2 is undergone an electrical breakdown at the time t6 as described above, and the main discharge is started across the main discharge electrodes 1, 2. The laser medium is excited by the main discharge, and the laser light is produced in several nsec.

In the discharge circuit for pulsed laser 20 of this application example, when the preionization is caused owing to the corona discharge produced by the preionization electrode 4 according to the voltage VCpp of the preionization capacitor Cpp which is charged at the time t1 shown in FIG. 5, the main discharge gap 3 is fully preionized before the main discharge is started at the time t6 shown in FIG. 5.

Here, for example the time TC1 in the characteristics shown in FIG. 3 corresponds to the time t6 shown in FIG. 5. Therefore, the main discharge by the main discharge electrodes 1, 2 in the application example of this embodiment is caused in the fully preionized state.

As described above, according to this embodiment described above, the one end of the preionization capacitor Cpp whose other end is connected to the preionization electrode 4 is not connected to the peaking capacitor Cp but to the immediately previous capacitor C2 or the two-stage previous capacitor C1. Therefore, the emission timing of the preionization can be caused in synchronization with the charging of the capacitor C2 or the capacitor C1. Thus, the main discharge can be caused by the main discharge electrodes 1, 2 in the fully preionized state.

Consequently, the main discharge (namely, the glow discharge) is readily caused, the produced main discharge is stabilized, and the laser output can be stabilized.

Figure 6:
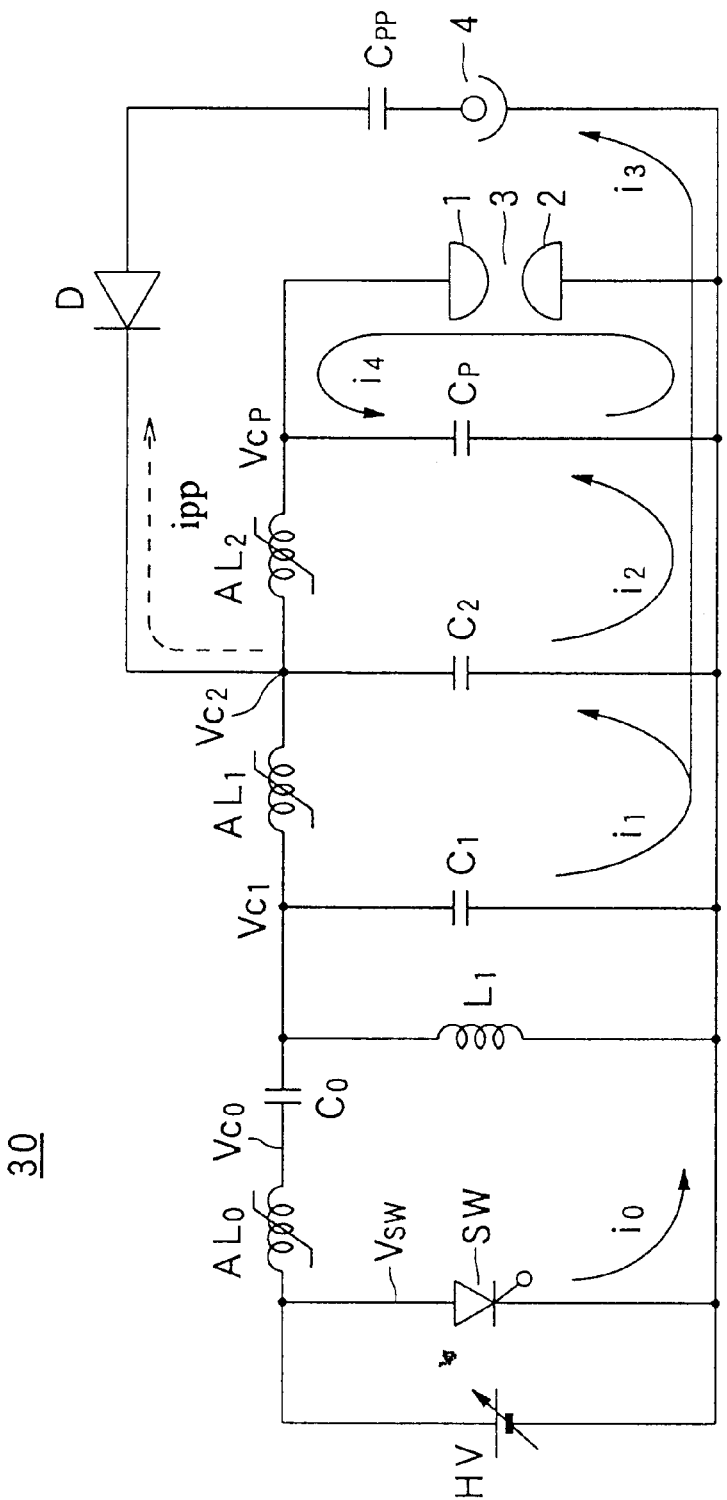
FIG. 6 is a circuit block diagram showing a structure of the discharge circuit for pulsed laser according to a second embodiment of the invention.

Second Embodiment:

FIG. 6 shows an equivalent circuit of discharge circuit for pulsed laser 30 according to the second embodiment of the invention.

The discharge circuit for pulsed laser 30 has a structure similar to that of the equivalent circuit of the first embodiment shown in FIG. 1 except that diode D is disposed between the capacitor C2 and the preionization capacitor Cpp.

In the discharge circuit for pulsed laser 30 of the second embodiment, a transfer of an electric charge from the capacitor C0 to the capacitor C1, from the capacitor C1 to the capacitor C2 and from the capacitor C2 to the peaking capacitor Cp is performed in the same way as in the discharge circuit for pulsed laser 10 (namely, the conventional discharge circuit for pulsed laser shown in FIG. 10) shown in FIG. 1.

The diode D is disposed to prevent the occurrence of a corona discharge, namely its occurrence two times, at the preionization electrode 4 when the electric current pulse i2 flows to transfer the electric charge from the capacitor C2 to the peaking capacitor Cp. Details will be described afterward.

Reasons of preventing the occurrence of the corona discharge two times by the diode D will be described.

In the equivalent circuit shown in FIG. 6, if the diode D is omitted (namely, in the equivalent circuit shown in FIG. 1), the electric charge is also transferred to the preionization capacitor Cpp when the electric charge is transferred from the capacitor C1 to the capacitor C2 as the electric current pulse i1 flows.

In other words, the preionization capacitor Cpp is charged in synchronization with the charging of the capacitor C2 as described in the first embodiment, and the voltage VCpp of the preionization capacitor Cpp is increased. And, when the voltage of the preionization electrode 4 is increased to the preionization start voltage through the preionization capacitor Cpp, the corona discharge is caused at the preionization electrode 4. This corona discharge is one (a first corona discharge) necessary to preionize the main discharge gap 3.

When the electrical charge is transferred from the capacitor C2 to the peaking capacitor Cp as the current pulse i2 flows, the current pulse ipp flows in the direction indicated by the dotted arrow in FIG. 6 because the magnetic switch AL1 is changed from on to off.

In other words, the preionization capacitor Cpp is also charged in synchronization with the charging of the peaking capacitor Cp, and the voltage VCpp of the preionization capacitor Cpp is increased. At this time, the voltage VCpp has a polarity opposite to that case when the first corona discharge is caused. When the voltage of the preionization electrode 4 is increased to the preionization start voltage through the preionization capacitor Cpp, the corona discharge (a second corona discharge) is caused at the preionization electrode 4.

Meanwhile, when the voltage VCp of the peaking capacitor Cp is increased as the current pulse i2 flows and it reaches a predetermined main discharge start voltage, the main discharge is caused across the main discharge electrodes 1, 2 as described in the first embodiment. And, the laser medium is excited by the main discharge, and the laser light is produced in several nsec.

It is seen from the relationship between the preionization discharge (namely, the corona discharge) necessary for the preionization and the main discharge that the corona discharge (preionization discharge) is caused two times while the main discharge is caused one time necessary for the laser oscillation of the pulsed laser light for a single pulse.

It means that the main discharge gas 3 is fully preionized by the first corona discharge so that the main discharge can be caused, but the corona discharge (the second corona discharge) is caused again. The second corona discharge is actually not necessary.

It is seen from the electric charge, which is transferred from the capacitor C2 to the peaking capacitor Cp as the current pulse i2 flows, that the electric charges accumulated in the capacitor C2 are transferred to and accumulated in the peaking capacitor Cp and the preionization capacitor Cpp.

It means that the electric charges accumulated in the capacitor C2 which are to be transferred to the peaking capacitor Cp are partly transferred to the preionization capacitor Cp and the electric charges to be accumulated in the peaking capacitor Cp are partly lost.

In the peaking capacitor Cp where the electric charges are accumulated such a loss as above, charging is not performed sufficiently, and the voltage (charging voltage) VCp is lowered. Therefore, the main discharge by the main discharge electrodes 1, 2 becomes unstable, and the laser oscillation cannot be made stably.

Consequently, the diode D is disposed in a direction opposite to the current pulse ipp as shown in FIG. 6 in the second embodiment so that the corona discharge is prevented from occurring two times (namely, the two corona emissions), in other words, the current pulse ipp shown in FIG. 6 is prevented from flowing to the preionization capacitor Cpp.

Then, an application example of the second embodiment will be described below.

Figure 7:
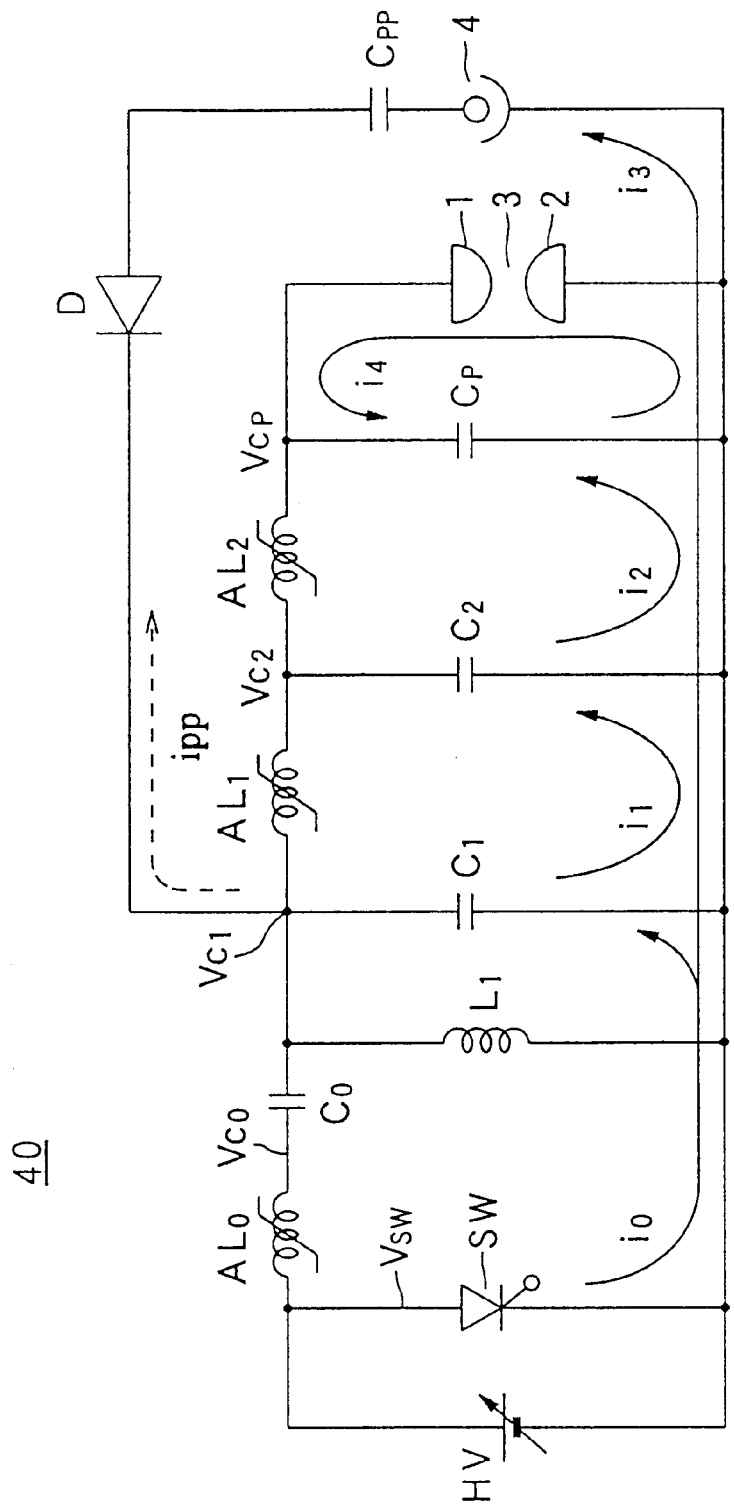
FIG. 7 is a circuit block diagram showing the structure of an application example of the second embodiment.

FIG. 7 shows an equivalent circuit of the discharge circuit for pulsed laser 40 of this application example. The discharge circuit for pulsed laser 40 has a structure similar to the equivalent circuit of the discharge circuit for pulsed laser 30 shown in FIG. 6 except that a connecting portion of the cathode of the diode D is changed. The diode D of this application example has its cathode connected to the capacitor C1.

Basically, the discharge circuit for pulsed laser 40 has the same function as the aforesaid discharge circuit for pulsed laser 30.

In the discharge circuit for pulsed laser 40 of this application example, the diode D is also disposed to prevent the corona discharge from causing two times (namely, the two corona emissions), in other words, to prevent the current pulse ipp from flowing to the preionization capacitor Cpp shown in FIG. 7, in the same way as the case of the aforesaid discharge circuit for pulsed laser 30.

In this application example, when the electric charge is transferred from the capacitor C0 to the capacitor C1 as the current pulse i0 flows, the electric charge is also transferred to the preionization capacitor Cpp. Thus, the preionization discharge (namely, the corona discharge) is caused at the preionization electrode 4 as described above. This corona discharge is a corona discharge (the first corona discharge) necessary for the preionization of the main discharge gap 3.

Then, when the electric charge is transferred from the capacitor C1 to the capacitor C2 as the current pulse i1 flows, if the diode D is omitted from the equivalent circuit shown in FIG. 7 (in other words, the equivalent circuit shown in FIG. 4), the current pulse ipp flows in the direction indicated by the dotted arrow in FIG. 7 because the magnetic switch AL0 is changed from on to off. But, in this application example, the current pulse ipp does not flow to the preionization capacitor Cpp because the diode D is disposed toward the direction against the flow of the aforesaid current pulse ipp as shown in FIG. 7.

In other words, in the discharge circuit for pulsed laser 40 of this application example, the second preionization discharge (namely, the second corona discharge) by the preionization electrode 4 as the current pulse ipp flows to the preionization capacitor Cpp can also be prevented.

As described above, the same operation and effect as in the first embodiment can be expected by the second embodiment.

Besides, when the electric charge is transferred from the capacitor C0 to the capacitor C1 or from the capacitor C1 to the capacitor C2 in the second embodiment, the corona discharge (namely, the preionization discharge) can be limited to the minimum required one time only in correspondence with the single main discharge necessary to cause the laser oscillation of the pulsed laser light for one pulse because the current pulse ipp can be prevented from flowing to the preionization capacitor Cpp in the first embodiment.

In other words, because only one corona discharge is caused by the single main discharge in the second embodiment, the electric charges to be accumulated in the peaking capacitor Cp can be prevented from having a loss as compared with the first embodiment. Thus, the main discharge by the main discharge electrodes 1, 2 can be stabilized, and the laser oscillation can be performed stably.

Figure 8:
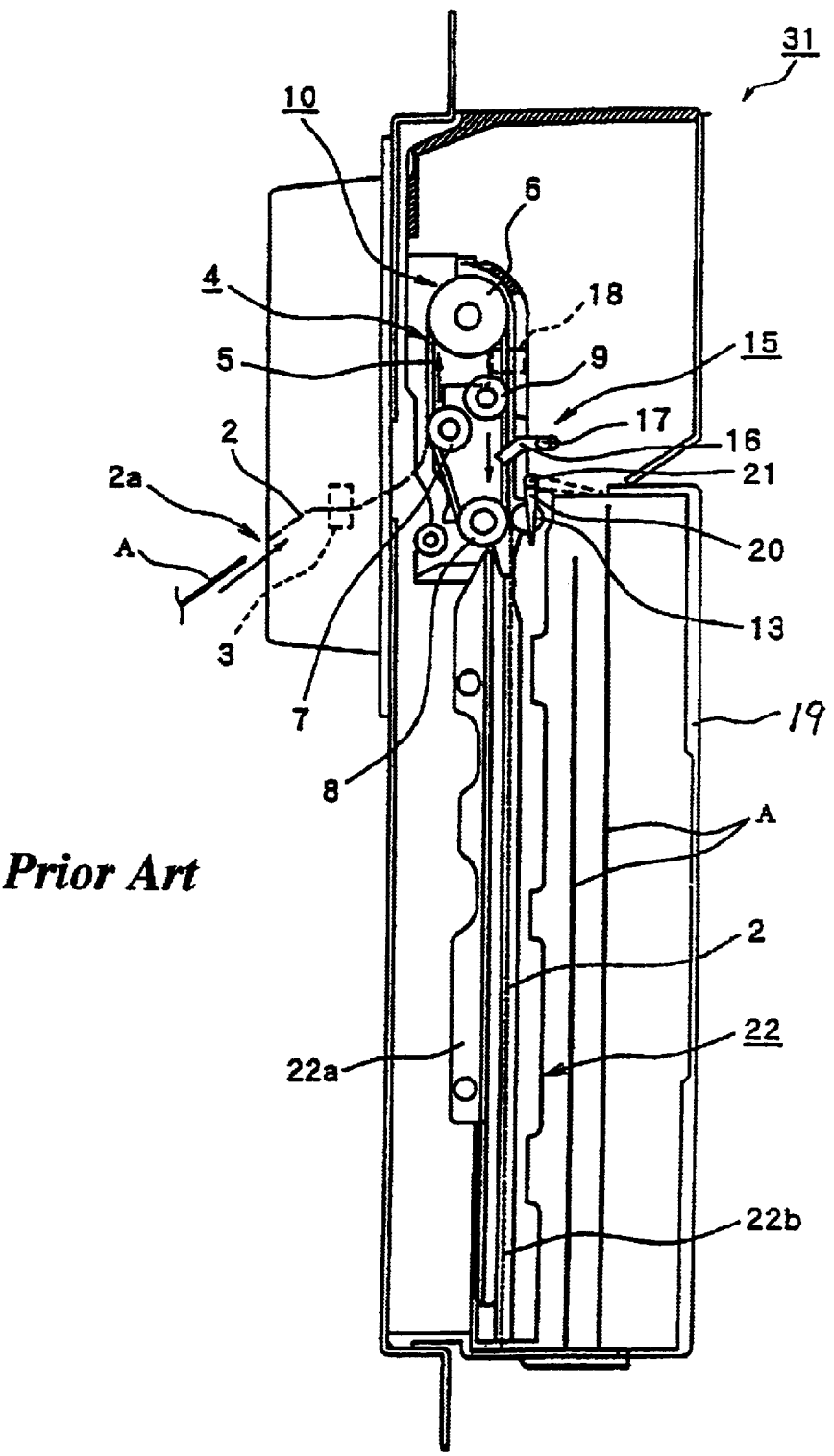
FIG. 8 is a circuit block diagram showing a structure of the discharge circuit for pulsed laser according to a third embodiment of the invention.

Third Embodiment:

FIG. 8 shows the equivalent circuit of discharge circuit for pulsed laser 50 according to the third embodiment of the invention.

This discharge circuit for pulsed laser 50 is configured by omitting the diode D from and adding the saturable reactor AL3 to an equivalent circuit of the second embodiment shown in FIG. 6.

The discharge circuit for pulsed laser 50 has the same function as that of the discharge circuit for pulsed laser 30 of the second embodiment shown in FIG. 6.

Therefore, the saturable reactor AL3 of FIG. 8 is used in the same way as the diode D of the discharge circuit for pulsed laser 30 of the second embodiment to prevent the current pulse ipp from flowing in the direction indicated by the dotted arrow in FIG. 8 if the saturable reactor AL 3 is omitted (namely, an equivalent circuit of the first embodiment shown in FIG. 1) in FIG. 8.

Then, an application example of the third embodiment will be described below.

Figure 9:
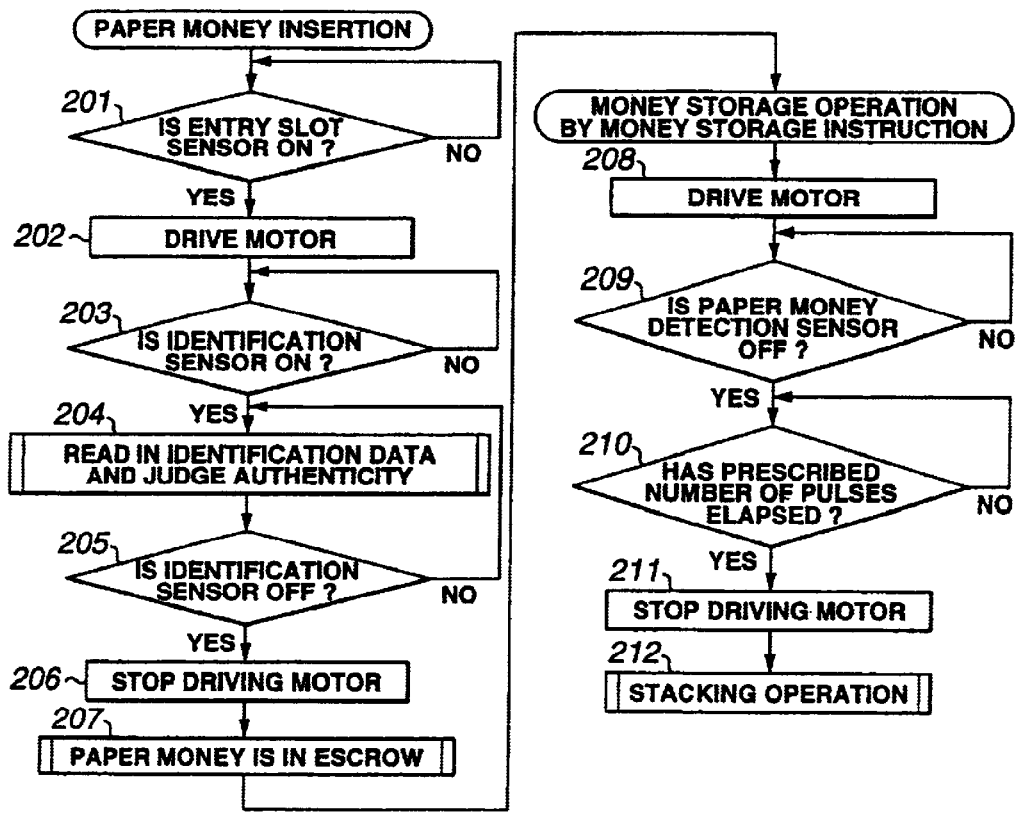
FIG. 9 is a circuit block diagram showing the structure of an application example of the third embodiment.

FIG. 9 shows an equivalent circuit of discharge circuit for pulsed laser 60 of the application example.

The discharge circuit for pulsed laser 60 is configured by omitting the diode D from and adding the saturable reactor AL3 to an equivalent circuit of the second embodiment shown in FIG. 7.

The discharge circuit for pulsed laser 60 is designed to have the same function as that of the discharge circuit for pulsed laser 40 of the application example of the second embodiment shown in FIG. 7.

Therefore, the saturable reactor AL3 of FIG. 9 is used in the same way as the diode D of the discharge circuit for pulsed laser 40 of the second embodiment to prevent the current pulse ipp from flowing in the direction indicated by the dotted arrow in FIG. 9 if the saturable reactor AL3 is omitted (namely, an equivalent circuit of the first embodiment shown in FIG. 4) in FIG. 9.

As described above, the same operation and effect as in the second embodiment can be expected from the third embodiment.

Besides, according to the third embodiment, reliability can be improved in comparison with the diode D, namely the semiconductor device, used to prevent the current pulse ipp from flowing to the preionization capacitor Cpp in the second embodiment.

What is claimed is:

1. A discharge circuit for pulsed laser including a power supply and main discharge electrodes disposed in a laser medium, in which a main discharge is caused after causing a preionization between the main discharge electrodes, the discharge circuit comprising:

a main discharge capacitor connected in parallel to the main discharge electrodes for accumulating electric charges;

a forwarding capacitor connected in parallel to the main discharge capacitor for accumulating electric charges supplied from the power supply;

a magnetic switch disposed in correspondence with the forwarding capacitor for transferring the electric charges accumulated in the forwarding capacitor to the main discharge capacitor;

a preionization electrode separate from said main discharge electrodes for preionizing between the main discharge electrodes;

a preionization capacitor directly connected at one connecting portion thereof to the preionization electrode, for accumulating electric charges for causing a preionization discharge at the preionization electrode; and a one-directional circuit element having a first connection portion and a second connection portion, the first connection portion being connected with the other connecting portion of the preionization capacitor and the second connection portion being connected with the forwarding capacitor and the magnetic switch disposed in correspondence with the forwarding capacitor, the one-directional circuit element allowing an electric current to flow from the first connection portion to the second connection portion and at least temporally preventing an electric current from flowing from the second connection portion to the first connection portion.

2. The discharge circuit for pulsed laser according to claim 1 wherein the forwarding capacitor is comprised of at least one forwarding capacitor connected in parallel to the main discharge capacitor;

the magnetic switch is disposed in correspondence with the at least one forwarding capacitor and comprised of at least one magnetic switch for transferring the electric charges accumulated in the forwarding capacitor to a next forwarding capacitor or the main discharge capacitor; and the other connecting portion of the preionization capacitor is connected to a predetermined particular forwarding capacitor among the at least one forwarding capacitor.

3. The discharge circuit for pulsed laser according to claim 2, wherein the other connecting portion of the preionization capacitor is connected to a final forwarding capacitor or a forwarding capacitor which is disposed on the side of the power supply than the side of the final forwarding capacitor.

4. The discharge circuit for pulsed laser according to claim 1, wherein the one-directional circuit element is a diode.

5. The discharge circuit for pulsed laser according to claim 1, wherein the one directional circuit element is a saturable reactor which is pre-saturated by a forward current.

6. The discharge circuit for pulsed laser according to claim 2, wherein the one-directional circuit element is a diode.

7. The discharge circuit for pulsed laser according to claim 2, wherein the one-directional circuit element is a saturable reactor which is pre-saturated by a forward current.

8. The discharge for pulsed laser according to claim 3, wherein the one-directional circuit element is a diode.

9. The discharge circuit for pulsed laser according to claim 3, wherein the one-directional circuit element is a saturable reactor which is pre-saturated by a forward current.

* * * * *